Nov. 16, 1937.  C. W. RYERSON  2,099,410

LAMINATED RIM CONSTRUCTION AND METHOD OF MAKING THE SAME

Filed Oct. 27, 1934

Inventor
Creighton W. Ryerson
By Beaman & Langford
Attorneys

Patented Nov. 16, 1937

2,099,410

UNITED STATES PATENT OFFICE 2,099,410

LAMINATED RIM CONSTRUCTION AND METHOD OF MAKING THE SAME

Creighton W. Ryerson, Jackson, Mich., assignor to Ryerson & Haynes, Inc., Jackson, Mich., a corporation of Michigan Application October 27, 1934, Serial No. 750,264

5 Claims. (Cl. 301—97)

The present invention relates to improvements in rim structures and the method of making the same. Particularly the invention relates to a bicycle rim or the like having a thin metallic covering or shell imparting a lustrous or otherwise decorative appearance to the exposed outer surface of the rim.

It is an object of the present invention to provide an inexpensive, durable, and highly decorative rim for bicycle wheels and the like.

Another object is to provide a laminated rim structure in which a lustrous, plated or ornate metallic covering or shell caps the exposed outer surface of the rim body to enhance the appearance of the same.

A further object is to provide a rim of the aforesaid type in which the metallic covering or shell is secured in position without welding, and creeping is prevented.

Figure 1:
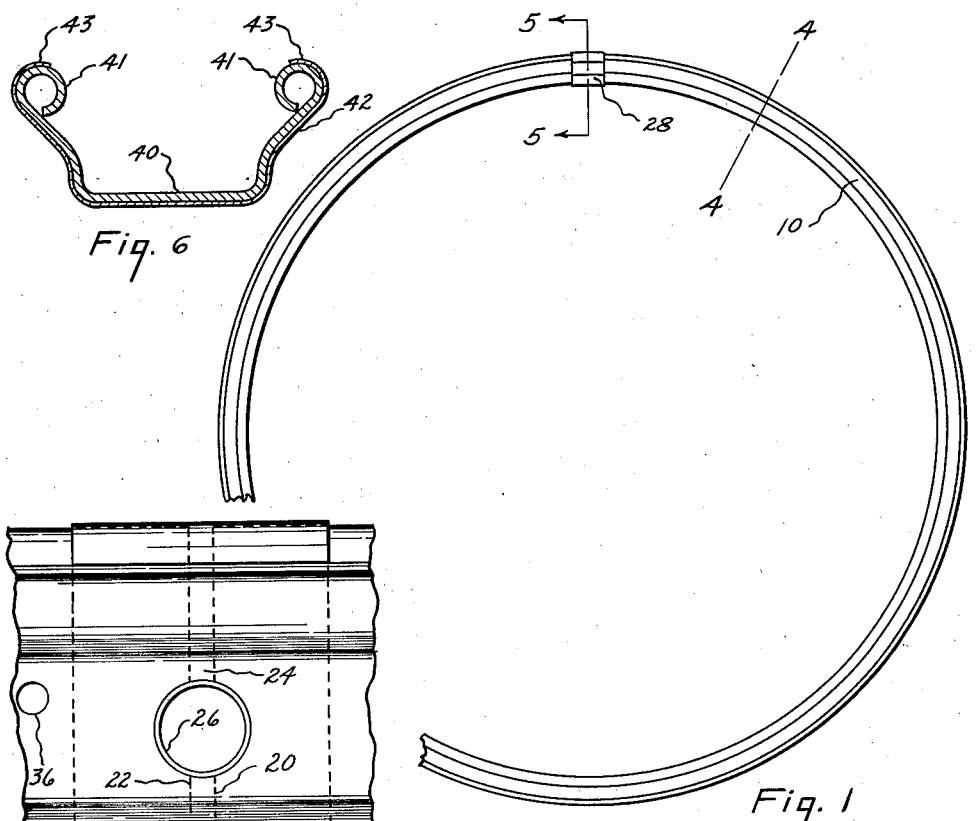
Figure 2:
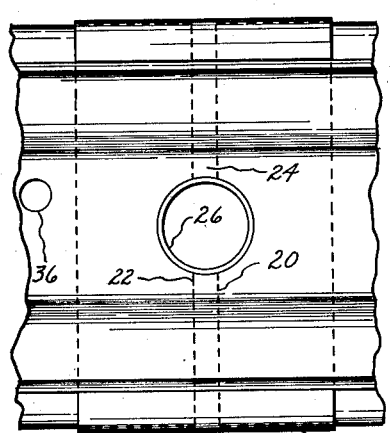
Figure 3:
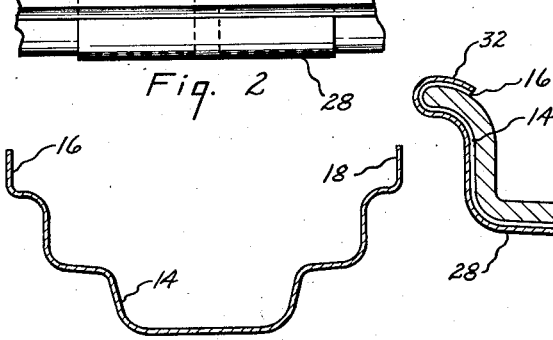
Figure 5:
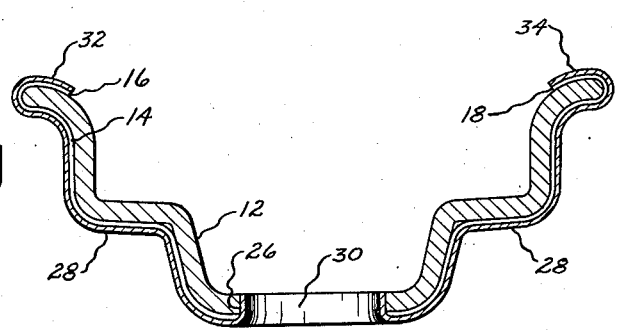
Figure 4:
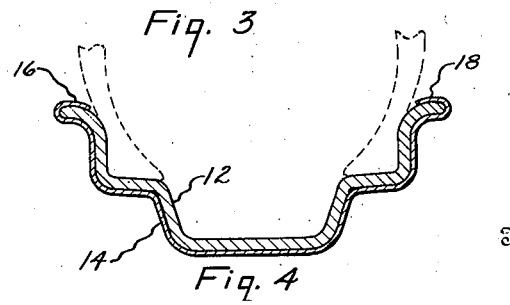

These and other objects and advantages will become apparent from the following description when considered in connection with the accompanying drawing in which, Fig. 1 is a side elevational view of my improved rim, Fig. 2 is a fragmentary view of the underside of the rim showing the valve hole and cover plate for the ends of the shell which caps the rim, Fig. 3 is a cross-sectional view of the metallic covering or shell prior to being rolled upon the rim body, Fig. 4 is a cross-sectional view of the rim taken on line 4—4 of Fig. 1, Fig. 5 is a cross-sectional view taken on line 5—5 of Fig. 1 through the valve hole and between the ends of the covering or shell shown in Fig. 2, and Fig. 6 discloses the invention applied to another form of rim having rolled edges.

Prior to the present invention it has been the practice, if a nickel or chromium plated steel rim was desired, to first roll, weld and size the rim and then polish and plate the same. This method has not proven entirely satisfactory for the reason that the surface of the rim is decidedly irregular, particularly in the case of dropped center rims, making it exceedingly difficult to economically remove the tool marks which is necessary to obtain satisfactory plating. In addition, the rolling of the rim section tends to open up the grain of the metal in localities where extreme drawing takes place, whereby unsatisfactory plating results at such localities. Aside from the difficulties and expense in preparing the rim for plating, even at this late date it is extremely difficult to obtain uniform results in the plating tank. Moreover, none of the commercial plates giving a buffed lustrous surface have sufficient resistance to corrosion and flaking to give satisfactory results for rim purposes. Such corrosion may be contributed to the failure and inability to provide a proper foundation for the plate and the cracking of the plate due to flying obstacles from the running wheel. Also, the rim of a wheel is subjected to more moisture and is given less opportunity to dry off than other conventional plated parts of the vehicle, obviously accelerating corrosion.

According to the present invention the difficulties of prior practice are overcome in the manufacture of a rim having a durable buffed lustrous surface by capping the exposed surface of the solid steel rim section with a strip of polished and/or buffed stainless steel strip or equivalent corrosion resisting alloy. The steel rim section is preferably first rolled, formed into a loop, welded and sized and then a thin stainless steel strip rolled to the contour of the rim section is suitably imposed upon the rim section to form a laminated structure.

Referring specifically to the preferred form of the invention illustrated in the drawing, a laminated rim structure 10 of the dropped center type is shown in Fig. 1 in its finished state. The rim consists of a solid steel section 12 which is preferably rolled out of a galvanized strip into a helical coil, cut to proper length and diameter, welded, and sized by expanding, all in a manner well known in the art. As shown in Fig. 4, the steel section 12 is capped with a thin stainless steel shell 14. The shell 14 is preferably rolled from a thin strip of material into a helical coil with the cross-section shown in Fig. 3 which conforms to the outer contour of the steel section 12. Prior to the rolling operation, while in a flat state, the shell 14 is polished and/or buffed to impart a high luster to the exposed surface. As stainless steel strip is relatively expensive, it is advantageous to reduce the width of the strip used to a minimum. This is accomplished as shown in Figs. 3 and 4 by having the overlapping edges 16 and 18 of just sufficient length to be rolled over and firmly clinched upon the flared edges of the tire retaining flanges of the rim and yet terminated short of the side walls of the tire. By terminating the edges 16 and 18 short of the tire wall all roughness upon the inner side of the rim is avoided with which the tire or tube might otherwise detrimentally engage. The strips from which is fabricated the shell 14 are cut at the proper length from the helical coil and imposed upon the rim section 12 by rolling the edges 16 and 18 over the flanges thereof. With the laminated structure then constituted, the ends 20 and 22 of the strip forming the shell 14 are in contiguous opposed relation as shown in Fig. 2. Within commercial manufacturing tolerances a gap 24 will be presented between the ends 20 and 23 varying slightly in width with different rims.

With the laminated rim structure constituted as heretofore related, the valve stem hole 26 is pierced. It is to be noted that this operation takes place at the gap 24 resulting in opposed portions of the valve hold being defined by sectors removed from the ends 20 and 22 of the strip. A cover plate 28 of stainless steel having drawn neck portion 30 defining an aperture is employed to cover the gap 24 and to prevent creeping of the shell 14 which caps the exposed surfaces of the rim section 12. The portion 30 of the cover closely fit in the valve hole pierced in the laminated rim structure and prevents any shift of the shell 14 relative to the section 12. This is because the cover plate 28 is held against shifting by the portion 30 extending through the hole 26 in the section 12 and the ends 20 and 22 of the shell 14 are in abutting relation with opposite sides of the portion 30. As shown in Fig. 5, the cover plate 28 is held in position by being clinched over the rim flange as at 32 and 34. It is to be noted that the edges of the cover plate are also terminated short of the side walls of the tire in the manner of the shell 14 for similar reasons. The last steps in the manufacture include piercing the spoke holes 36 and buffing the stainless steel shell.

Referring particularly to Fig. 6 there is shown another form of rim 40 known as the clincher type and having rolled edges 41. The shell 42 is applied in the same manner as the shell 14 is applied to the rim 12. As in the case of the shell 14 the shell 42 extends over the edge 41 a sufficient distance, as indicated at 43, to clinch the same on the rim 40.

From the foregoing description it should become apparent that I have provided a convenient and inexpensive method for the manufacture of a laminated rim structure which lends itself readily to variations permitted within manufacturing tolerances. Also, welding of the shell 14 has been eliminated by the employment of the cover plate 28. In addition, a rim having a buffed lustrous surface highly resistant to corrosion results which may be manufactured as inexpensively as a plated rim possessing the objectionable features heretofore set forth.

It is to be understood that although I consider the termination of the edges of the shell 14 short of the tire walls as a feature of my invention, the extension of the edges further along the inner walls of the rim section is contemplated. Also, it may be further advantageous to plate a thin strip from which the shell 14 is fabricated in lieu of using a strip of stainless steel or other alloy having a lustrous surface resistant to corrosion.

Having described my invention, what I claim as new and desire to protect by Letters Patent is:

1. A laminated dropped center bicycle rim or the like comprising a relatively thick steel section having tire retaining flanges, a relatively thin stainless steel shell conforming to and capping the outer exposed surface of said section, the edges of said shell embracing said flared edges and terminating contiguous to the tire walls, said shell being split with its opposed ends partially defining a valve stem aperture in said section, and a cover plate concealing said ends and having a flange portion defining an aperture adapted to be received in said first aperture to prevent relative circumferential movement between said shell and rim section, said cover plate closely following the outer surface of said shell and having the edges thereof embracing the tire retaining flanges to prevent bodily removal.

2. A laminated dropped center bicycle rim or the like comprising a relatively thick steel section having tire retaining flanges, a relatively thin shell having corrosion resisting properties presenting a lustrous surface conforming to and capping the outer exposed surface of said section, the edges of said shell embracing said tire retaining flanges and terminating contiguous to the tire walls, said shell being split with its opposed ends partially defining a valve stem aperture in said section, and a cover plate concealing said ends and having a flange portion defining an aperture adapted to be received in said first aperture to prevent relative circumferential movement between said shell and rim section, said cover plate closely following the outer surface of said shell and having the edges thereof embracing the tire retaining flanges to prevent bodily removal.

3. A laminated bicycle rim or the like comprising a relatively thick steel section having tire retaining flanges, a relatively thin metallic shell having a lustrous surface and resistant to corrosion, said shell conforming to and capping the outer exposed surface of said section, the edges of said shell embracing said tire retaining flanges, said shell being split with its ends contiguously arranged, a cover plate superimposed over said ends to conceal the split, said cover plate closely following the outer surface of said shell and having the edges thereof embracing the tire retaining flanges to prevent bodily removal, said cover plate and laminated rim structure defining an aperture for a valve stem, and means associated with said cover plate preventing relative circumferential movement between said shell and said section.

4. A laminated bicycle rim or the like comprising a relatively thick metallic section having tire retaining flanges having flared edges, a relatively thin metallic split shell resistant to corrosion conforming to and capping the outer exposed surface of said section, the edges of said shell embracing said flared edges and terminating contiguously with the tire walls, and means for preventing relative circumferential movement between said shell and rim section, said means comprising an abutment engaging the ends of a shell at the split.

5. A laminated bicycle rim structure or the like comprising a continuous annular section having tire retaining flanges and constituting the body of the structure, a metallic ornamental shell capping the exposed surface of said section with its edge rolled over said flanges, said shell being formed as a split annulus, and a cover plate concealing the split portion of said shell having means abutting the edges of a shell to prevent relative movement between said body and shell.

CREIGHTON W. RYERSON.